United States Patent
Nielsen et al.

(10) Patent No.: US 11,884,029 B2
(45) Date of Patent: Jan. 30, 2024

(54) METHOD OF MANUFACTURING A WIND TURBINE BLADE WITH FEWER MANUFACTURING DEFECTS

(71) Applicant: LM Wind Power A/S, Kolding (DK)

(72) Inventors: Lars Nielsen, Kolding (DK); Klavs Jespersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 151 days.

(21) Appl. No.: 17/427,335

(22) PCT Filed: Feb. 7, 2020

(86) PCT No.: PCT/EP2020/053070
§ 371 (c)(1),
(2) Date: Jul. 30, 2021

(87) PCT Pub. No.: WO2020/161276
PCT Pub. Date: Aug. 13, 2020

(65) Prior Publication Data
US 2022/0134686 A1    May 5, 2022

(30) Foreign Application Priority Data
Feb. 7, 2019    (EP) .................................... 19155990

(51) Int. Cl.
*B29C 70/48* (2006.01)
*B29C 70/54* (2006.01)
(Continued)

(52) U.S. Cl.
CPC .......... *B29C 70/443* (2013.01); *B29C 70/547* (2013.01); *B29D 99/0028* (2013.01); *B29L 2031/082* (2013.01)

(58) Field of Classification Search
CPC ....... B29C 70/44; B29C 70/48; B29C 70/546; B29C 70/547
See application file for complete search history.

(56) References Cited

U.S. PATENT DOCUMENTS 5,484,642 A * 1/1996 Bompard .............. B29C 70/547
442/337
7,258,828 B2 * 8/2007 Fish ........................ B29C 65/54
156/286

(Continued)

FOREIGN PATENT DOCUMENTS

| EP | 1428650 A1 | 6/2004 | |
| EP | 2778393 A2 | 9/2014 | |
| WO | WO-2015114098 A1 * | 8/2015 | ......... B29C 70/0035 |

OTHER PUBLICATIONS

Ghaheh, F.S., et al., Antioxidant cosmetotextiles: Cotton coating with nanoparticles containing vitamin E, Process Biochemistry, vol. 59, Part A (Aug. 2017), pp. 46-51. (Year: 2017).*

(Continued)

*Primary Examiner* — Matthew J Daniels
(74) *Attorney, Agent, or Firm* — Nath, Goldberg & Meyer; Jerald L. Meyer; Tanya E. Harkins

(57) ABSTRACT

The present invention relates to a method of manufacturing a wind turbine blade using a two-step curing process, wherein the second curing is performed in the presence of a resin flow medium (76) comprising a curing inhibitor.

13 Claims, 5 Drawing Sheets

Figure 1:
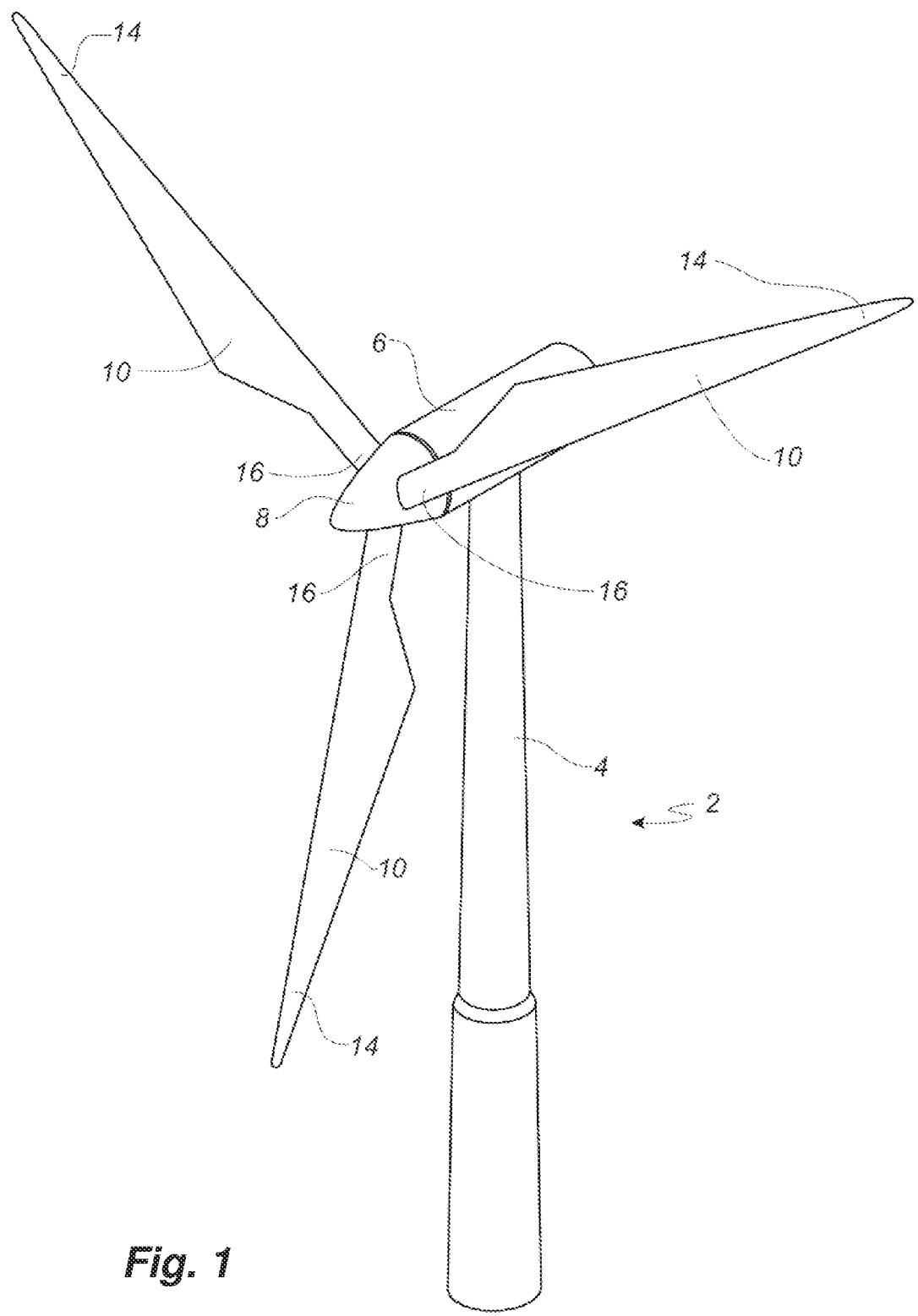

(51) Int. Cl.
*B29C 70/44* (2006.01)
*B29D 99/00* (2010.01)
*B29L 31/08* (2006.01)

(56) References Cited

U.S. PATENT DOCUMENTS

| | | | | |
|---|---|---|---|---|
| 7,595,112 | B1* | 9/2009 | Cano | B29C 70/088 |
| | | | | 428/221 |
| 9,751,239 | B2* | 9/2017 | Murai | B29D 99/0003 |
| 9,782,939 | B2* | 10/2017 | Murai | B29D 99/0014 |
| 11,440,274 | B2* | 9/2022 | Tokutomi | B29C 70/48 |
| 2004/0140587 | A1* | 7/2004 | Hadley | B29C 70/48 |
| | | | | 264/258 |
| 2004/0219855 | A1* | 11/2004 | Tsotsis | B29C 48/05 |
| | | | | 442/364 |
| 2009/0115112 | A1* | 5/2009 | Liebmann | B29C 70/443 |
| | | | | 264/510 |
| 2013/0280483 | A1* | 10/2013 | Hayashi | B29C 45/02 |
| | | | | 428/137 |
| 2014/0333008 | A1* | 11/2014 | Harboe | B29C 31/04 |
| | | | | 425/162 |
| 2016/0257102 | A1* | 9/2016 | Butler | B32B 37/1045 |
| 2018/0186103 | A1 | 7/2018 | Hunter et al. | |
| 2020/0391455 | A1* | 12/2020 | Shimono | B29C 70/528 |

OTHER PUBLICATIONS

International Search Report dated May 12, 2020 for application No. PCT/EP2020/053070.
Priority Search Report dated Aug. 19, 2019 for application No. EP19155990.5.

* cited by examiner

Fig. 6A-E

METHOD OF MANUFACTURING A WIND TURBINE BLADE WITH FEWER MANUFACTURING DEFECTS

This is a National Phase Application filed under 35 U.S.C. 371 as a national stage of PCT/EP2020/053070, filed Feb. 7, 2020, an application claiming the benefit of European Patent Application No. 19155990.5, filed Feb. 7, 2019, the content of each of which is hereby incorporated by reference in its entirety.

FIELD OF THE INVENTION

The present invention relates to a method of manufacturing a wind turbine blade resulting in fewer manufacturing defects using a two-step curing process and a resin flow medium comprising an inhibitor. The first curing step forms an outer shell part followed by a second curing step forming a load carrying structure, wherein the second curing step utilizes a resin flow medium coated with a cure inhibitor.

BACKGROUND OF THE INVENTION

The rotor blades of modern wind turbines capture kinetic wind energy by using sophisticated blade design created to maximise efficiency. A major trend in wind turbine development is the increase in size to reduce the leveraged cost of energy. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using blade moulds. First, a blade gel coat or primer is applied to the mould. Subsequently, fibre reinforcement and/or fabrics are placed into the mould followed by resin infusion. The resulting shell halves are assembled by being glued or bolted together substantially along a chord plane of the blade. In most cases, wind turbine rotor blades are made in large parts, e.g., as two aeroshells with a load-carrying box (spar) or internal webs that are then bonded together.

Vacuum infusion or VARTM (vacuum assisted resin transfer moulding) is one method, which is typically employed for manufacturing composite structures, such as wind turbine blades comprising a fibre-reinforced matrix material. During the manufacturing process, liquid polymer, also called resin, is filled into a mould cavity, in which fibre material has been arranged, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibres arranged in mats, felt mats made of individual fibres or unidirectional or woven mats, i.e. multi-directional mats made of fibre rovings, etc. In order to form a laminate that is thick by the root and gradually becomes thinner towards the tip, most plies run from the root only partly toward the tip. A second mould part, which is often made of a resilient vacuum bag, is subsequently placed on top of the fibre material and sealed against the first mould part in order to generate a mould cavity. By generating a vacuum, typically 80 to 95% of the total absolute vacuum, in the mould cavity between the first mould part and the vacuum bag, the liquid polymer can be drawn in and fill the mould cavity with the fibre material contained herein.

Resin transfer moulding (RTM) is another manufacturing method, which is similar to VARTM. In RTM the liquid resin is not drawn into the mould cavity due to a vacuum generated in the mould cavity. Instead the liquid resin is forced into the mould cavity via an overpressure at the inlet side. Currently, vacuum assisted resin transfer molding (VARTM) is the most common manufacturing method for manufacturing of wind turbine rotor blades.

When producing large blades, the main laminate gets proportionally larger, also in terms of its overall volume. Since such parts usually have a comparatively low thickness towards their edges this may lead to problems during curing. In particular, this may lead to undesired differences in curing temperatures within the main laminate. Thinner parts of the element may not receive significant exotherm heat, thus not heating up as much as thicker, central parts of the reinforcing element. This may lead to manufacturing defects within the part as the degree and timing of shrinkage during the curing process may vary spatially, i.e. the degree and timing of shrinkage in the thicker parts may be different from the degree and timing of shrinkage in the edge portions. Thus, manufacturing defects may arise during curing due to volume shrinkage of the cured resin. This is especially a problem with styrene-based resins, such as unsaturated polyester resins mixed with styrene, which undergo a significant volume shrinkage. The shrinkage will be evident as deformation, internal stress or cracks in the laminate after curing and demolding. Furthermore, it may be a challenge to avoid the formation of wrinkles at double-curved areas and at areas with un-wetted fibers where air bubbles can be entrapped in the bondlines. A major issue may also be that many of these damage modes are not easily detectable since the damage do not necessarily originate from the external surfaces and may not be visible. These defects may be detrimental to the overall aerodynamic performance of the blade, as the airfoil profile is affected by the outer shell geometry. Furthermore, the defects also influence the overall strength of the blade and the expected lifetime. Thus, after manufacturing, the blades are subjected to quality control and manufacturing defects are repaired, since a large blade represents a large value in materials. Thus, increasing blade sizes means that it becomes less and less attractive to discard blades with manufacturing defects. Hence, improved methods for manufacturing of larger blades are desired to eliminate some of the defects that may arise during curing.

Thus, a first aspect of the present invention relates to a method of manufacturing a wind turbine blade or parts thereof resulting in less manufacturing defects, in particular it is an object of the present invention to eliminate manufacturing defects such as internal stress and delaminations caused by volume shrinkage of the resin in the second cure step of the two-step infusion process. More particularly, it is an object of the present invention to postpone the adhesion of the load carrying structure to the outer shell part until the load carrying structure has found its natural geometry.

It is a further object of the present invention to provide a method of manufacturing a wind turbine blade which is cost-effective and flexible.

SUMMARY OF THE INVENTION

The present inventors have found that one or more of said objects may be achieved by a method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:

provoiding a mould (66), arranging a first set of one or more layers of fibre material in the mould for providing an outer shell part (70), injecting the first set of one or more layers of fibre material with a curable resin, and curing the resin to obtain an outer shell part (70), arranging a resin flow medium (76) on top of at least part of the outer shell part (70) followed by a second set of one or more layers of fibre material for forming a load-carrying structure (74), injecting the resin flow medium (76) and the second set of one or more layers of fibre material for forming a load-carrying structure (74) with a curable resin, and curing the resin to adhere the outer shell part (70) to the load-carrying structure (74) to obtain a shell half of a wind turbine blade wherein the resin flow medium (76) comprises a curing inhibitor.

The inventors have surprisingly found that defects from the second curing process, i.e. the curing of the load-carrying structure, can be eliminated or reduced by using a resin flow medium comprising a chemical curing inhibitor delaying the cure in the interface between the outer shell part and the load-carrying structure. This results in an unconstrained curing process of the load-carrying structure (i.e. main laminate) eliminating stress cracks and internal stress in the cured laminate and hence leaves the laminate in a new natural cured geometry. After most of the load-carrying structure has cured and found its final geometry it is then adhered to the outer shell due to the postponed curing in the layer comprising the resin flow medium coated with a curing inhibitor. In other words, the deviations between the original and cured geometry is absorbed in the resin flow medium which cures last to adhere to the outer shell part.

As curing of resin is an exothermic process (i.e. releasing heat) thicker parts tend to reach higher temperatures during curing which further accelerate the curing in these parts. This leads to uneven curing and manufacturing defects as the degree and timing of shrinkage during the curing process may vary spatially, i.e. the degree and timing of shrinkage in the thicker parts may be different from the degree and timing of shrinkage in the edge portions. Hence, it may be desirable to inhibit curing more around thicker parts of the laminate compared to thinner parts as found in the edges. Thus, depending on the dimensions of the load-carrying structure the curing inhibitor may be applied to the resin flow medium such that it covers all of or only part of the surface wherein inhibition of curing is desired. Thus, in a preferred embodiment of the invention the curing inhibitor covers at least a first part of the surface of the resin flow medium. In some instances, thinner parts (e.g. edges) of the load-carrying structure may cure at an undesirable slow rate compared to the thicker parts of the load-carrying structure. This may be the case even when curing inhibitor is applied to the resin flow medium at an area where the load-carrying structure is comparatively thick. This results in prolonged manufacturing time of the blades (i.e. increased recycle time of the moulds). In such cases it may be beneficial that the edges of the resin flow medium comprise a curing promoter. Thus, in another embodiment of the invention the resin flow medium further comprises a curing promoter. It follows that mixing of curing inhibitor and curing promoter may even out their respective effects. Hence, generally different parts of the resin flow medium are coated only with either one of them. Thus, in another embodiment of the invention the curing promoter covers at least a second part of the surface of the resin flow medium, which is different from the first part of the surface of the resin flow medium covered with the curing inhibitor.

The mould may comprise a moulding surface corresponding substantially to the outer shell part of a wind turbine blade shell half. Typically, the step of arranging one or more layers of fibre material in the mould for providing an outer shell includes laying several layers of fibre material successively onto the moulding surface of the mould. The fibre material may comprise glass fibres, carbon fibres or hybrid fibres (i.e. combinations thereof). In a preferred embodiment of the method, a glass fibre material is placed into the mould, such as multiple layers of glass fibre material, for providing an outer shell part (i.e. skin element). The fibre material may optionally be brought into contact with a binding agent before or during the fibre lay-up. The fibre lay-up process may involve aligning a plurality of fibres, or fibre layers, substantially unidirectionally. In one embodiment, the fibre material may include fibre rovings, such as glass fibre rovings. The lay-up process may include placing multiple single roving bundles into the mould, the roving bundles being preferably aligned unidirectionally.

Next, the one or more layers of fibre material are injected with a curable resin. The resin used according to the present invention may be either a thermosetting or thermoplastic resin, preferably a thermosetting resin. In an embodiment of the invention, the thermosetting resin is selected from an ester-based resin, such as an unsaturated polyester resin, a vinyl ester resin or a urethane (meth)acrylate resin. In another embodiment, the resin may be a thermoplastic resin, such as nylon, PVC, ABS, polypropylene or polyethylene. In a preferred embodiment, the resin comprises a polyester, such as an unsaturated polyester. An unsaturated polyester resin may be cured by free radicals which are formed when organic peroxides decompose. The decomposition initiates a reaction by which unsaturated polyester molecules polymerize with styrene forming a three-dimensional structure.

The resin may be mixed with the curing initiator (i.e. radical initiator) prior to the resin infusion, such as a peroxide or an azo compound. Preferably a peroxide is used, and the resin is then cured, either with or without external heating from e.g. a heating blanket. In a preferred embodiment of the invention, curing of the resin is performed without external heating.

Typically, the peroxide is selected from the group consisting of hydrogen peroxide or salts thereof; organic peroxides or salts thereof such as tert-butyl hydroperoxide, methyl ethyl ketone peroxide (MEKP) or benzoyl peroxide; peroxy acids or salts thereof such as peroxymonosulfuric acid, peroxydisulfuric acid, potassium persulfate, ammonium persulfate or peracetic acid. Preferably, the peroxide is methyl ethyl ketone. Suitable azo compounds may be selected from the group consisting of AIBN or ABCN. The radical initiator may spontaneously decompose into free radicals initiating the curing process (i.e. the polymerization of the resin) or decomposition of the radical initiator may be accelerated using heat, light or one or more curing promoters. Advantageously, when no external heating is applied a redox system (i.e. promoter and initiator) may be used. Such redox systems may comprise an oxidizing agent, such as a peroxide (radical initiator) and a soluble transition metal ion acting as reductant through single electron transfer (i.e. as curing promoter). Hence the curing promoter preferably increases the activity of the oxidizing agent at lower temperatures, such as at ambient temperatures, thus enhancing the generation of free radicals and the curing rate of the resin.

Once the outer shell it cured the second step is initiated by arranging the resin flow medium comprising the curing inhibitor with one or more layers of fibre material to obtain a load-carrying structure. In a preferred embodiment, the load-carrying structure is a main laminate or spar cap of the wind turbine blade for supporting one or more shear webs. The main laminate is typically formed as a fibre insertion which comprises a plurality of fibre reinforcement layers, e.g. between 20 and 50 layers.

The resin flow medium advantageously aids in the transport (i.e. filling the mould) of the resin during the vacuum assisted infusion process. In an embodiment of the invention the resin flow medium is a flow fabric, such as a mesh of a polymeric material or a fibre mat with open meshes. Typically, the resin flow medium comprises or is made of a glass fibre, a carbon fibre or a hybrid mat comprising carbon and glass fibres. The resin flow medium may be coated with the curing inhibitor and optionally the curing promoter prior to arranging it in the mould on top of at least a part of the outer shell part (i.e. skin element) or after it has been placed in the mould. In a preferred embodiment, the resin flow medium is coated with the curing inhibitor and optionally a curing promoter prior to the step of arranging the resin flow medium on top of at least part of the outer shell part. Alternatively, the fibre material of the resin flow medium may be contacted with the curing inhibitor and optionally the curing promoter, dried and stored for later use.

The skilled person is familiar with a wide range of curing inhibitors and promotes. Typically, the curing promoter comprises a metal salt or a metal complex. The curing promoter of the present invention may comprise one or more salts or complexes of metals such as lithium, calcium, copper, vanadium, zirconium, titanium, zinc, iron, sodium, potassium, magnesium, manganese, barium and cobalt. Typical counter ions to the metal in the salt may include but are not limited to mono or dicarboxylic acids, halides, hydroxides, sulfates or nitrates. Typical ligands in a metal complex may include but are not limited to halides, phosphines (e.g. triphenylphosphine), mono or dicarboxylic acids, amines (e.g. ethylenediamine, 2,2-bipyridine, pyridine), nitrate, hydroxide, carbon monoxide or mixtures thereof. A preferred curing promoter according to the present invention may comprise a transition metal salt or complex. In some embodiments, the curing promoter may be pre-mixed to form a metal complex prior to contacting the resin flow medium with the curing promoter. In other embodiments, individual components of the curing promoter may be contacted with the resin flow medium separately to form the metal complex in situ. In a preferred embodiment, the curing promoter comprises a transition metal such as cobalt, manganese, iron, copper or mixtures thereof capable of acting as a reductant. In a more preferred embodiment, the curing promoter comprises one or more organic cobalt salts and/or one or more amines, such as tertiary amines. Tertiary amines are known to aid in the decomposition of peroxides, such as benzoyl peroxide into radicals. The curing promoter and the radical initiator may thus function as a redox system facilitating the formation of free radicals at lower temperatures such that the curing promoter accelerates the curing of resin. Useful curing systems include but are not limited to methylethylketone, cyclohexanone or acetylacetone peroxides in combination with a cobalt-containing compound such as organic cobalt salts, or dibenzoyl peroxide in combination with one or more tertiary amines.

The curing inhibitor will advantageously decelerate the curing of resin. The curing inhibitor is selected from a primary antioxidant (i.e. radical scavenger), a secondary antioxidant (hydroperoxide scavenger) or mixtures thereof. In some cases, the curing inhibitor may act as both a primary and secondary antioxidant. Typically, primary antioxidants react with peroxy radicals however under oxygen-deficient conditions (e.g. in manufacturing) the lifetime of highly reactive alkyl radicals can be long enough to be scavenged (either by hydrogen abstraction forming a less reactive radical or by termination between two radicals). Primary antioxidants include but are not limited to hindered amines (e.g. tetramethylpiperidine or analogues thereof), secondary aromatic amines, nitroxyl radicals (e.g. TEMPO and TEMPOL), hydroxylamines (e.g. TEMPOH) and phenolic antioxidants such as butylated hydroxytoluene (BHT) or analogues thereof. Secondary antioxidants may include but are not limited to organophosphorus compounds (e.g. phosphines or phosphites), thioethers, thiols, hydroxylamines or amines capable of reducing an organic hydroperoxide formed or a radical initiator (e.g. hydrogen peroxide or a peroxyacid) in turn being oxidized. In a preferred embodiment the curing inhibitor is BHT or an analogue thereof. A primary antioxidant such as BHT initially forms a stabilized radical by hydrogen abstraction that may further react with additional radicals to form nonradical products. The majority of the phenolic antioxidants contain two tertiary butyl groups on the $2^{nd}$ and $6^{th}$ positions; these groups are able to shield the formed phenoxy radical (sterical hindrance) and prevent initiation of a new oxidation cycle. The curing inhibitor hence functions to neutralize radicals (peroxy and carbon centered) formed in the resin mixture and thus prevent or terminate the propagation of the polymer (i.e. the curing). Hence, the curing inhibitors used in the present invention is suitable in any resin mixture relying on radical chemistry during the curing.

Polyester resins are most often added styrene as additive to reduce the viscosity and make the resin easier to handle such as during vacuum assisted infusion. Besides reducing the viscosity, the styrene also facilitates the cross-linking of the chains of the polyester. The volume shrinkage during resin curing usually is in the range of 2-10% of the initial resin volume and is typically more pronounced for styrene-based resins. Hence, manufacturing defects are more likely to arise due to the increased volume shrinkage in these resins. Thus, in a preferred embodiment of the invention the method is applied to inhibit curing in a styrene-based resin or polyester based resin, such as an unsaturated polyester comprising styrene.

A second aspect of the invention relates to the resin flow medium comprising a curing inhibitor for use in a method according to the first aspect. The resin flow medium comprises a top surface and bottom surface with a cross section consisting of a central portion and two opposing outer edges. In a preferred embodiment of the invention the resin flow medium is a flow fabric, such as a mesh of a polymeric material or a fibre mat with open meshes. Typically, the resin flow medium is made of a glass fibre, a carbon fibre or a hybrid mat comprising carbon and glass fibres.

The resin flow medium may be a single fibre mat or may comprise one or more layers of fibres (e.g. one or more mats on top of each other) depending on the desired thickness. Thus, the thickness of the resin flow medium may vary depending on e.g. the dimensions of the main laminate and/or the viscosity of resin used in the manufacture. Typically, the thickness of the resin flow medium is in the range from 1.0-16 mm, such as 1.5-12 mm, preferably 2.0-8.0 mm, more preferably 2.5-6.0 mm, most preferably 3.0-4.0 mm. The resin flow medium may have a uniform thickness across the whole surface, or the thickness of the resin flow medium may vary spatially across the resin flow medium (e.g. such that the central part portion is thicker and the outer edges thinner).

In an embodiment of the invention, the resin flow medium may be coated such that the curing inhibitor is uniformly distributed throughout the resin flow medium. In another embodiment, the curing inhibitor is uniformly coated on one surface, such as the top surface, or on both surface(s) of the resin flow medium, i.e. on its top surface and on its bottom surface, such that curing inhibitor is only present in an outer surface layer of the resin flow medium. In a preferred embodiment, the surface of the resin flow medium which faces the load-carrying structure comprises the curing inhibitor. In yet another embodiment the curing inhibitor concentration varies spatially within the resin flow medium such that the curing inhibitor concentration varies within one or more layers of the resin flow medium (i.e. different fibre layers e.g. individual fibre mats have different concentrations of curing inhibitor). As a non-limiting example, the upper layer (i.e. top surface) of the resin flow medium may have a lower concentration of curing inhibitor such that the concentration increases for each layer towards the bottom surface. This may be desirable, especially for thicker parts of resin flow medium in order to ensure that the adhesion of the resin to the outer shell proceeds as the last step in the curing. In yet another preferred embodiment, the curing inhibitor concentration varies spatially on the resin flow medium, such that the curing inhibitor concentration varies across the outer surface of the resin flow medium or at least part of it. In another preferred embodiment of the invention the curing inhibitor covers at least a first part of the surface of the resin flow medium e.g. such that it extends over a distance ($d_3$) around the central portion of the resin flow medium. In yet another embodiment of the invention the resin flow medium further comprises a curing promoter on a second part of the surface of the resin flow medium which is different from the first part.

In yet another preferred embodiment the resin flow medium comprises two opposing lateral edges and a central portion in between the two opposing lateral edges, wherein the concentration of curing inhibitor increases gradually from one or both lateral edges towards the central portion of the resin flow medium (i.e. smooth increase). When using such a concentration profile maximum inhibition is achieved at the thicker parts of the load carrying structure and lesser inhibition is obtained at the thinner edges. The amount of the curing inhibitor may vary depending on the inhibition desired, the dimensions of the load carrying structure, the resin used and/or the type and concentration of the radical initiator system. Typically, the curing inhibitor is present in an amount of 0.01-15 w/w % relative to the weight of the resin flow medium without the curing inhibitor (e.g. the total weight of the fibres if the resin flow medium consists of fibres).

In yet another embodiment of the invention, the resin flow medium is impregnated with a curing promoter at one or both outer edge regions (E1/E2) and a curing inhibitor around the central portion, such that the concentration of curing promoter gradually decreases to zero from one or both outer edges towards the central portion over a distance ($d_1$) of the resin flow medium and the curing inhibitor gradually increases from distance ($d_1$) towards the central portion over a distance ($d_2$). The decrease in concentration of curing promoter from one or both outer edges towards the central portion of the resin flow medium may also be an abrupt decrease from a given concentration to zero. The distance ($d_1$) may be the same for both edge regions or different, preferably the same. Such a concentration profile in the resin flow medium may be suitable in case the thinner parts (etc. edge regions) cure undesirably slow compared to the load carrying structure. The two outer edge regions will typically be opposing edge regions, such as a left edge region and a right edge region, as seen in a cross section of the resin flow medium. Each edge region may extend laterally within a distance ($d_1$) of 10 mm or less, 20 mm or less, 30 mm or less, 40 mm or less, 50 mm or less, 60 mm or less, 70 mm or less, 80 mm or less, or 90 mm or less, from the respective outer edge towards the central portion or midpoint of the resin flow medium, as seen in a cross section of the resin flow medium, preferably over the entire length of the resin flow medium. As used herein, extending laterally means an extension in the horizontal (width) direction (d) of the resin flow medium, as illustrated e.g. in FIG. 7. The length ($L_1$) of the resin flow medium" is preferably at least 10 meters, such as at least 20 meters or at least 30 meters. Advantageously, the length of the resin flow medium is equal to or in excess of the length of the load-carrying structure.

In an embodiment the curing promoter is present in the edge region(s) in a concentration of 0.01-15 w/w % of curing promoter relative to the weight of the fibre material and the curing inhibitor is present in the central region in a concentration of 0.01-15 w/w % relative to the weight of the fibre material. In a preferred embodiment, the curing promoter is present in the edge region in a concentration of 0.01 to 10 w/w %, such as 0.01 to 1 w/w %, or 0.1 to 1 w/w %, by weight of curing promoter relative to the weight of the fibre material.

In yet a preferred embodiment of the invention, the resin flow medium comprises two opposing lateral edges and a central portion in between the two opposing lateral edges, wherein the resin flow medium is coated with the curing inhibitor such that the curing inhibitor concentration is constant on at least part of the resin flow medium. As a non-limiting example, a first part of the resin flow medium (e.g. the edge regions) may be without any curing inhibitor whereas the rest of the resin flow medium is coated with the curing inhibitor. In general, the inventors found that the curing inhibitor in any of the above embodiments should be present in a concentration of 0.01-15 w/w % of curing inhibitor relative to the weight of the fibre material.

The skilled person is well aware of different methods suitable for applying the curing inhibitor and optionally the curing promoter. Preferably, the resin flow medium may be coated (impregnated) with the curing inhibitor and optionally the curing promoter. The curing inhibitor and optionally curing promoter may be applied as a coating solution, dispersion or a powder composition comprising the curing inhibitor or the promoter. The solutions and dispersions may be aqueous or may comprise a polar or non-polar organic solvent. In a preferred embodiment the curing inhibitor and optionally curing promoter is/are applied as a powder coating composition. In yet another embodiment the curing inhibitor or curing promoter is encapsulated in the powder coating composition such that it is first released once in contact with the resin.

The resin flow medium according to the second aspect may be used for minimizing or eliminating manufacturing defects during resin curing in the manufacturing of a wind turbine blade part, preferably during resin curing of a load-carrying structure, such as a main laminate or a spar cap. In a preferred embodiment the manufacturing defect is selected from delamination, deformation, internal stress, cracks or mixtures thereof. The resin flow medium comprising an inhibitor is particular useful for minimizing or eliminating manufacturing defects caused by difference in the degree and timing of shrinkage of the resin during the curing process of different parts (i.e. where the degree and timing of shrinkage in the thicker parts may be different from the degree and timing of shrinkage in the thinner parts)

It will be understood that any of the above-described features may be combined in any embodiment of the inventive method or resin flow medium. In particular, features and embodiments described with regard to the resin flow medium may also apply to the method of manufacturing, and vice versa.

As used herein, the term "longitudinal" means the axis running substantially parallel to the maximum linear dimension of the resin flow medium, the load carrying structure or the blade.

As used herein, the term "substantially" usually means what is specified, but may deviate from the specified amount by 15% or less, 10% or less or 5% or less.

As used herein, the term "% w/w" means weight percent. The term "relative to the weight of the fibre material" means a percentage that is calculated by dividing the weight of an agent, such as a curing inhibitor, by the weight of the fibre material. As an example, a value of 1% w/w relative to the weight of the fibre material corresponds to 10 g of curing promoter per kilogram of fibre material.

As used herein, the term "concentration" refers to a measure of an amount or weight of a substance, such as a curing inhibitor, contained per weight of dry material of the resin flow medium, such as the weight of fibre material, within a given region of the resin flow medium.

As used herein, the term "elongate" or "elongate resin flow medium" refer to a resin flow medium having two dimensions that are much less than a third dimension, such as at least three, five, ten or twenty times less than a third dimension. Typically, the third dimension will be the length (longitudinal extension) of the resin flow medium, as opposed to the two lesser dimensions, width and height (thickness). The length (longitudinal extension) of the resin flow medium will typically be in the spanwise direction of the wind turbine blade.

DETAILED DESCRIPTION OF THE INVENTION

Figure 2:
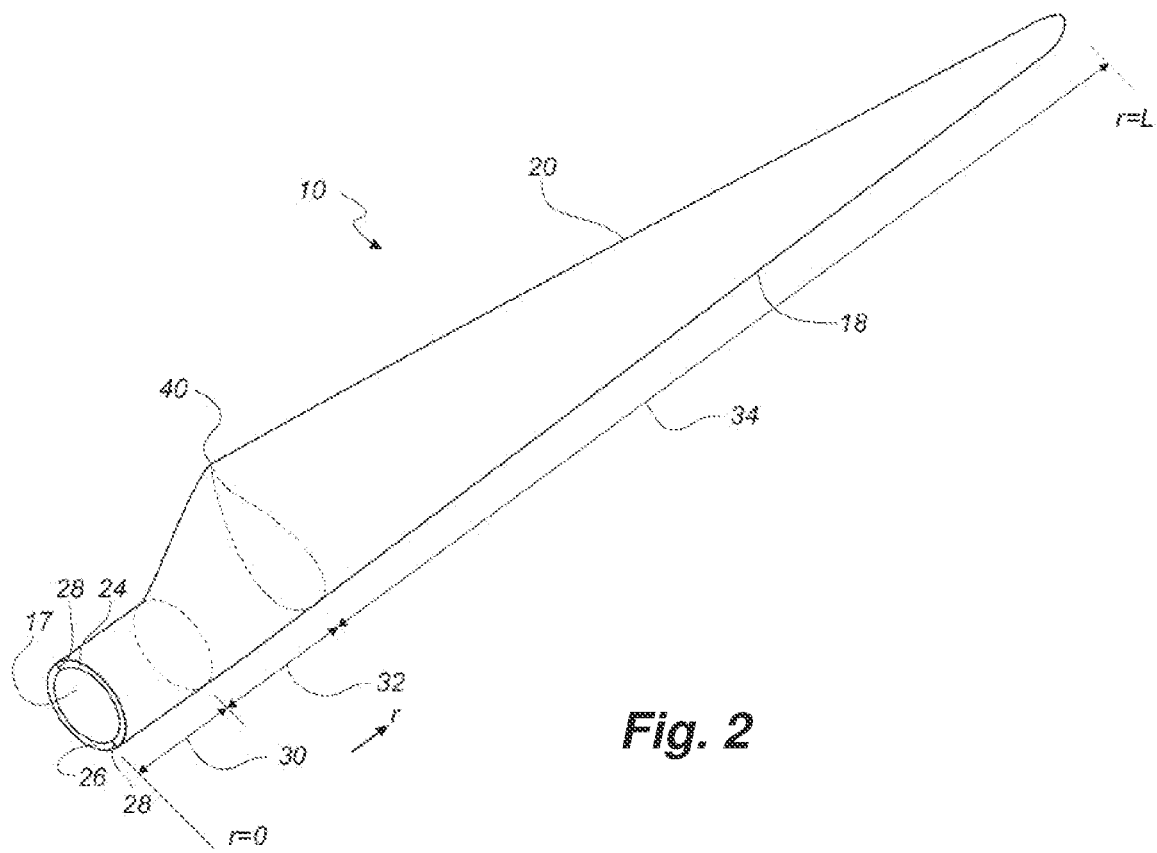
Figure 3:
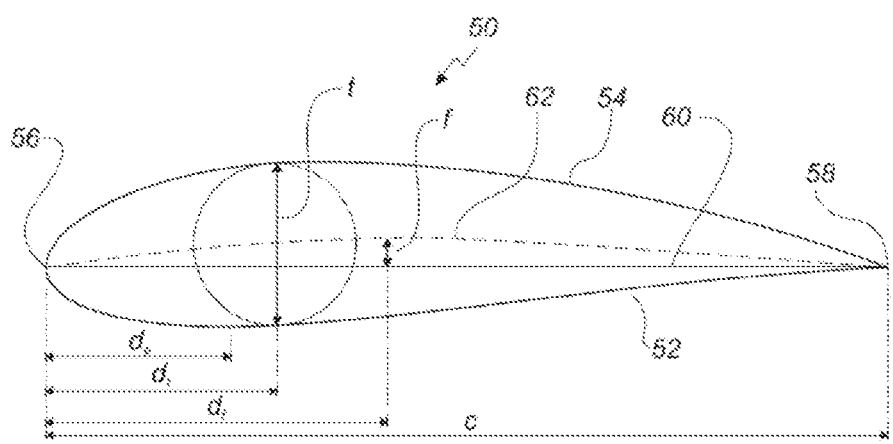
Figure 4:
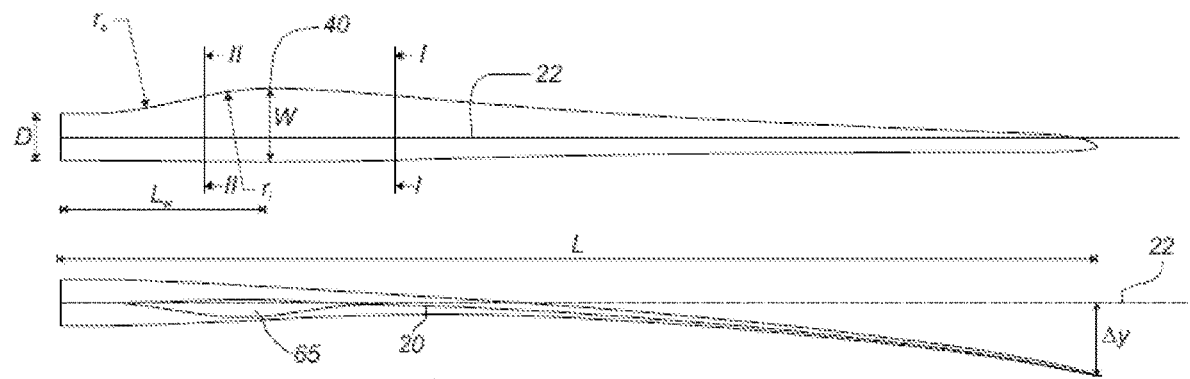
Figure 5:
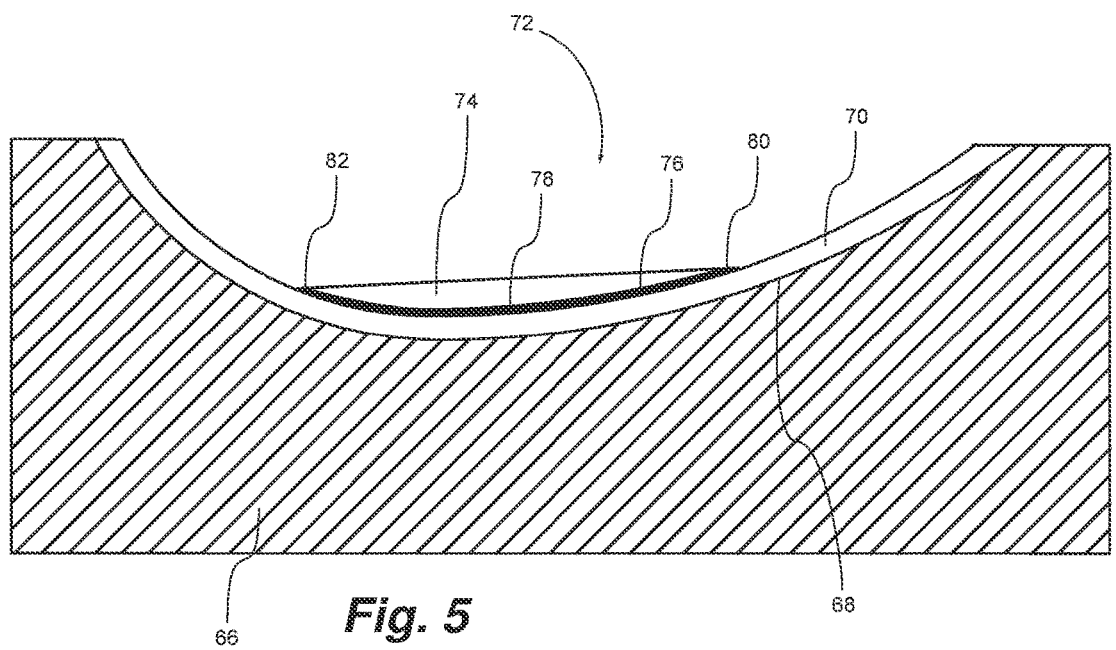
Figure 6:
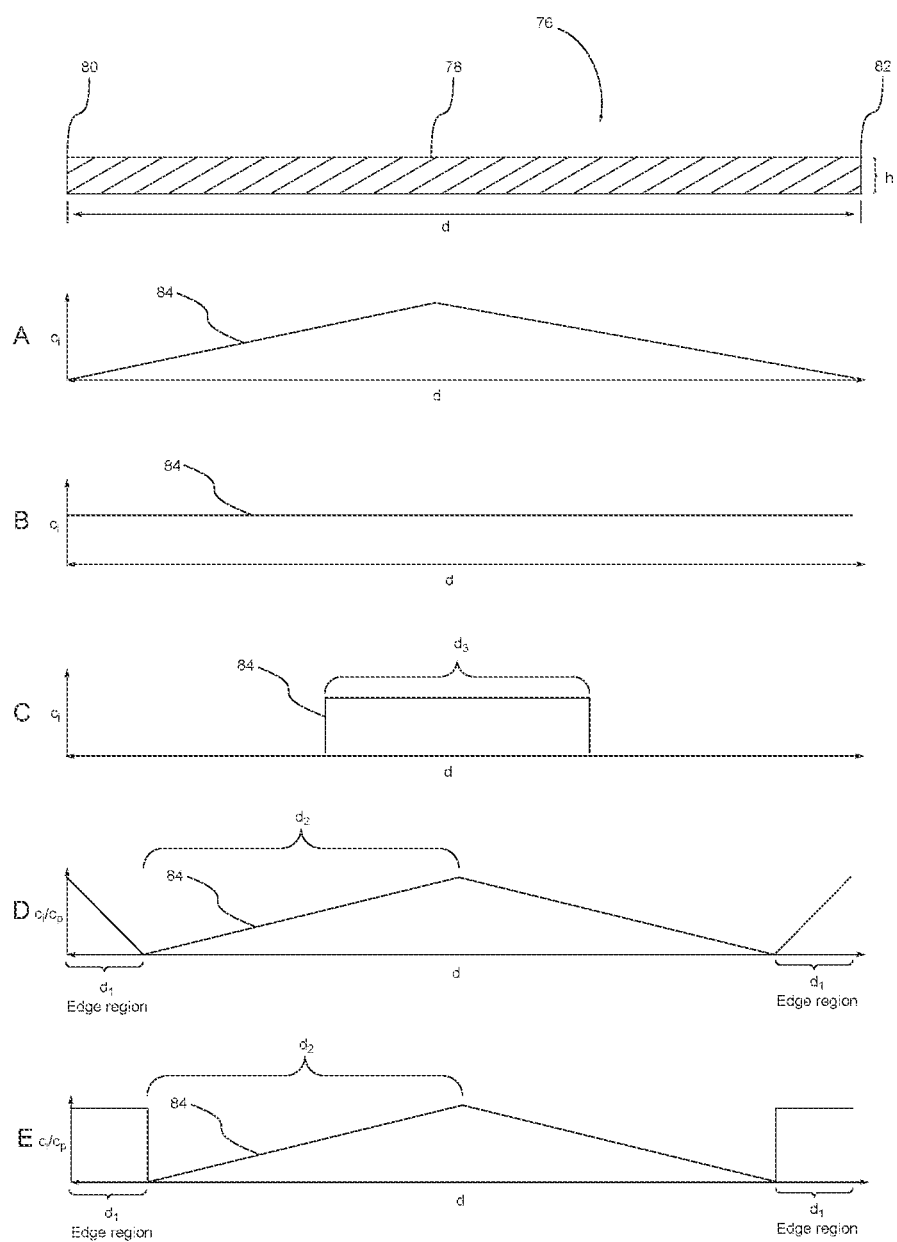
Figure 7:
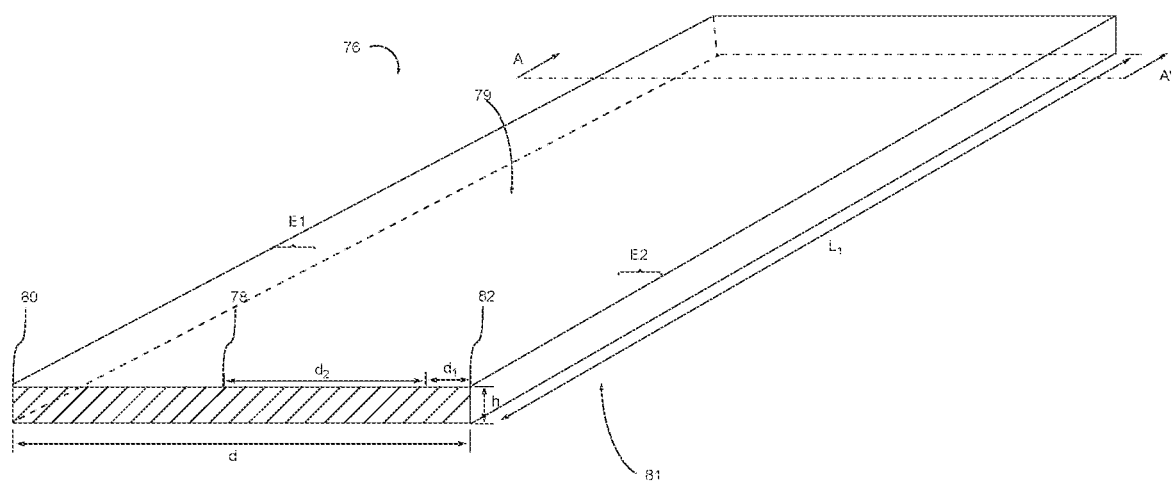
Figure 8:
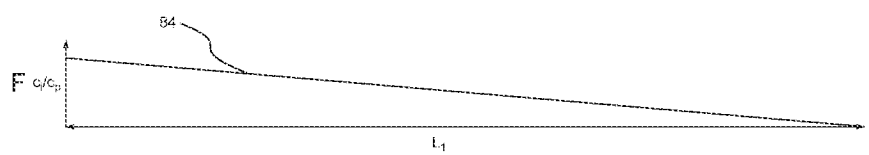

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a schematic cross-sectional view of a mould for moulding a blade part according to the present invention, and FIG. 6A-E shows a cross sectional view of the resin flow medium taken along the line A-A' in FIG. 7 coated with different concentration profiles of curing inhibitor and optionally promoter, FIG. 7 is a perspective view of a resin flow medium according to the present invention, and FIG. 8 illustrates another concentration profile across the resin flow medium.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 is a schematic cross-sectional view through a mould 66 for use in a method of manufacturing a wind turbine blade part, such as a blade half. The mould comprises a moulding surface 68, which defines an outer surface of the finished wind turbine blade, here shown as the suction side of the blade. In the first step of the two-step curing process a number of fibre layers typically together with additional material, such as sandwich material and/or balsa wood, are arranged on the moulding surface 68, followed by resin infusion and curing. These parts constitute the outer shell 70 (i.e. aerodynamic shell part) of the wind turbine blade (details not shown). The aerodynamic outer shell part 70 may for instance be manufactured by first applying a waxy substance to the moulding surface in order to be able to remove the shell part after moulding. Also, a gelcoat may be applied to the moulding surface. In the second step a resin flow medium 76 is arranged on at least a part of the outer shell with one or more fibre layers on top followed by resin infusion and curing. These parts constitute the load-carrying structure 74, such as a main laminate, that extends in a longitudinal direction of the blade.

FIG. 6A-E shows a cross-sectional view of the resin flow medium according to the invention coated with different concentration profiles of curing inhibitor and optionally curing promoter. FIG. 6A shows a resin flow medium, wherein the concentration of curing inhibitor increases gradually from both lateral edges towards the central portion of the resin flow medium. FIG. 6B shows a resin flow medium, wherein the concentration of curing inhibitor is constant across the resin flow medium over the distance d.

FIG. 6C shows a resin flow medium, wherein the concentration of curing inhibitor is constant across the resin flow medium over the distance $d_3$. FIG. 6D shows a resin flow medium, wherein the concentration of curing promoter decreases gradually to zero from both lateral edges towards the central portion over a distance ($d_1$) and the curing inhibitor gradually increases from distance ($d_1$) towards the central portion over a distance ($d_2$). FIG. 6E shows a resin flow medium, wherein the concentration of curing promoter decreases abrupt from a given concentration to zero from both lateral edges towards the central portion after a distance ($d_i$) and the curing inhibitor gradually increases from distance ($d_1$) towards the central portion over a distance ($d_2$).

FIG. 7 shows a resin flow medium 76 which comprise a top surface 79 and bottom surface 81 with a cross section consisting of a central portion 78 and two opposing outer edges 80, 82. The top surface 79 is usually the surface that faces the resin flow medium 76, whereas the bottom surface 81 is usually the surface that faces the outer shell part during normal use. The resin flow medium 76 further comprise two opposing edge regions E1 and E2 given by the distance $d_1$. The resin flow medium may be impregnated with a curing promoter at one or both outer edge regions E1/E2 of FIG. 7 and a curing inhibitor around the central portion, such that the concentration of curing promoter gradually decreases to zero from one or both outer edges towards the central portion over the distance $d_1$ of the resin flow medium and the curing inhibitor gradually increases from distance $d_1$ towards the central portion over the distance $d_2$. The decrease in concentration of curing promoter from one or both outer edges towards the central portion of the resin flow medium may also be an abrupt decrease from a given concentration to zero. The distance $d_1$ may be the same for both edge regions E1, E2 or different, preferably the same.

FIG. 8 shows a resin flow medium, wherein the concentration of curing inhibitor and/or promoter gradually decreases over the length $L_1$ of the resin flow medium such that the concentration is highest at the root end and lowest at the tip end of the load-carrying structure. Such a concentration profile may be combined with any of concentration profiles according to FIG. 6A-E.

The thickness (h) of the resin flow medium may be uniform or vary spatially within the resin flow medium such that it decreases from the central portion 78 towards each of the two outer edges 80, 82. Preferably prior to arranging the resin flow medium 76 in the mould, it is coated with a curing inhibitor according to one of the different embodiments described above.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side 54 suction side
56 leading edge
58 trailing edge
60 chord
62 camber line/median line
66 mould
68 moulding surface
70 outer shell part
72 shell halve of a wind turbine blade
74 load-carrying structure
76 resin flow medium
78 central portion of resin flow medium
79 top surface
80 first outer edge
81 bottom surface
82 second outer edge
84 concentration profile
c chord length
$c_i$ concentration of curing inhibitor
$c_p$ concentration of curing promoter
d distance
$d_t$ position of maximum thickness
$d_f$ position of maximum camber
$d_p$ position of maximum pressure side camber
E1, E2 outer edge regions
f camber
H horizontal direction
L blade length
$L_1$ resin flow medium length
LO longitudinal direction
r local radius, radial distance from blade root
t thickness
V vertical direction
Δy prebend

The invention claimed is:

1. A method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:
providing a mould (66);
arranging one or more first layers of fibre material in the mould for providing an outer shell part (70);
injecting the one or more first layers of fibre material with a curable resin;
curing the resin to obtain an outer shell part (70);
arranging a resin flow medium (76) on top of at least part of the outer shell part (70) followed by one or more second layers of fibre material for forming a load-carrying structure (74);
injecting the resin flow medium (76) and the one or more second layers of fibre material for forming a load-carrying structure with a curable resin and curing the resin to adhere the outer shell part (70) to the load-carrying structure (74) to obtain a shell half of a wind turbine blade,
wherein the resin flow medium (76) comprises a curing inhibitor.

2. The method according to claim 1, wherein the curing inhibitor covers at least a first part of the outer surface of the resin flow medium.

3. The method according to claim 1, wherein the resin flow medium further comprises a curing promoter and wherein the curing promoter covers at least a second part of the outer surface of the resin flow medium, which is different from the first part.

4. The method according to claim 1, wherein the curing inhibitor is uniformly coated on the surface of the resin flow medium.

5. The method according to claim 1, wherein the thickness of the resin flow medium varies spatially across the resin flow medium.

6. The method according to claim 1, wherein the curing inhibitor concentration varies spatially across the resin flow medium.

7. The method according to claim 1, wherein the curing inhibitor concentration varies within one or more layers of the resin flow medium.

8. The method according to claim 1, wherein the curing promoter comprises a transition metal.

9. The method according to claim 8, wherein the transition metal is selected from the group consisting of cobalt, manganese, iron, copper and mixtures thereof.

10. The method according to claim 1, wherein the curing inhibitor is a primary antioxidant.

11. The method according to claim 1, wherein the resin is a styrene based resin or a polyester based resin comprising styrene.

12. The method according to claim 11, wherein the polyester based resin comprising styrene is an unsaturated polyester.

13. The method according to claim 1, wherein the curing of the resin is performed without external heating.

* * * * *